United States Patent [19]
Ojeda

[11] Patent Number: 5,273,399
[45] Date of Patent: Dec. 28, 1993

[54] REFLECTIVE PROPELLER COVER

[76] Inventor: Christopher M. Ojeda, 2934 NW. 76th Ter., Gainesville, Fla. 32606

[21] Appl. No.: 568,882

[22] Filed: Aug. 17, 1990

[51] Int. Cl.⁵ ............................................. B63H 1/00
[52] U.S. Cl. .................................... 416/146 R; 416/61; 416/62; 440/49; 440/900; 116/30; 359/515
[58] Field of Search ...... 416/61, 62, 146 R, 247 R A; 440/49, 113, 900; 350/97, 99; 116/28 R, 30; 150/154, 157; 359/515, 522

[56] References Cited

U.S. PATENT DOCUMENTS

| | | | |
|---|---|---|---|
| 2,609,164 | 9/1952 | Dillon | 150/157 |
| 2,763,428 | 9/1956 | Selah | 416/247 R |
| 2,822,183 | 2/1958 | Montgomery | 416/247 A |
| 2,949,092 | 8/1960 | Fortune | 416/62 |
| 2,990,889 | 7/1961 | Welch | 416/62 |
| 3,993,016 | 11/1976 | Pulaski | 116/28 R |
| 4,045,122 | 8/1977 | Burdick | 280/414.1 |
| 4,257,247 | 3/1981 | Sims | 416/146 B |
| 4,676,721 | 6/1987 | Hardee | 416/247 R |
| 4,993,978 | 2/1991 | Johannes | 440/113 |
| 5,088,439 | 2/1992 | Anderson | 116/30 |

*Primary Examiner*—Edward K. Look
*Assistant Examiner*—James A. Larson

[57] ABSTRACT

A cover for a propeller is disclosed which is intended to be used while a boat on which the propeller is mounted is being transported on a trailer. The cover is either made of a reflective material or is covered with a reflective material and is intended to reflect light from headlights of vehicles following the trailer to provide an added safety factor when a boat is being towed by a vehicle.

5 Claims, 3 Drawing Sheets

REFLECTIVE PROPELLER COVER

BACKGROUND OF THE INVENTION

The present invention relates to a reflective propeller cover. Devices which are designed to cover propellers are known, as taught by U.S. Pat. No. 2,763,428 to Selah and U.S. Pat. No. 2,822,183 to Montgomery. However, neither of these patents teaches the concept of covering solely the propeller with a cover which has a reflective surface for the purposes set forth herein.

SUMMARY OF THE INVENTION

The present invention relates to a reflective propeller cover. The present invention includes the following interrelated aspects and features:

(A) In a first aspect, the inventive cover is designed to cover the blades and hub of a propeller as the propeller is mounted on a driveshaft of an associated boat.

(B) In the preferred embodiment, each blade has a separate cover which includes attachment means allowing each separate cover to be attached to adjacent covers for adjacent blades.

(C) Each separate cover includes a flap which, when combined with the flaps of the other covers, cover the hub of the propeller.

(D) In the preferred embodiment of the present invention, the inventive cover is made of a reflective material designed to reflect the light of headlights of following vehicles when the associated boat is being towed on a trailer by a towing vehicle. Alternatively, the cover may be made of a material such as, for example, burlap, and in this case may be covered with a reflective material or may have striped reflective patches thereon.

(E) In a further aspect, if desired, a sleeve device may be provided which may be used to lock the inventive cover onto the associated propeller to prevent theft.

As such, it is a first object of the present invention to provide a reflective propeller cover.

It is a further object of the present invention to provide such a reflective propeller cover with a separate cover for each propeller blade and means for interconnecting the separate covers together to form a single cover.

It is a yet further object of the present invention to provide such a device having either a reflective covering on a non-reflective material or wherein the cover itself is made of a reflective material.

It is a still further object of the present invention to provide such a device wherein each separate cover for each blade includes a flap which, when combined with other flaps of other separate covers, cover the propeller hub.

These and other objects, aspects and features of the present invention will be better understood from the following detailed description of the preferred embodiments when read in conjunction with the appended drawing FIGURES.

SPECIFIC DESCRIPTION OF THE PREFERRED EMBODIMENTS

Figure 1:
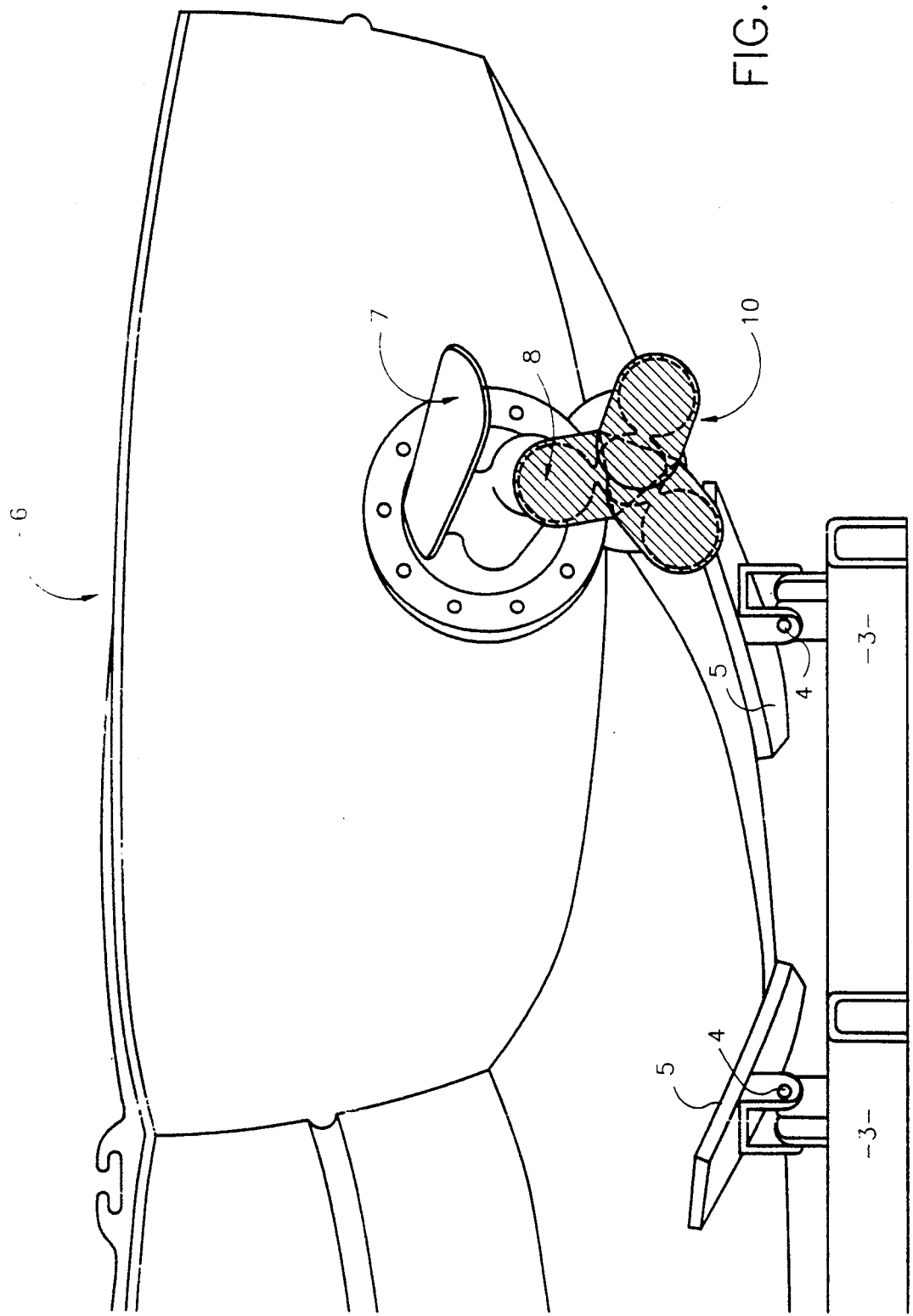
FIG. 1 shows a rear perspective view of a boat mounted on a trailer, with the boat having a propeller covered by the cover of the present invention.

With reference, first, to FIG. 1, a trailer 1 is seen to have a frame 3 having mounted thereon, via pivots 4, supports 5 which are intended to support the boat 6 on the trailer 1 for towing by an associated vehicle (not shown).

The boat 6 includes an outdrive 7 having a propeller 8 mounted on a propeller shaft 2. The inventive reflective propeller cover is generally designated by the reference numeral 10.

Figure 2:
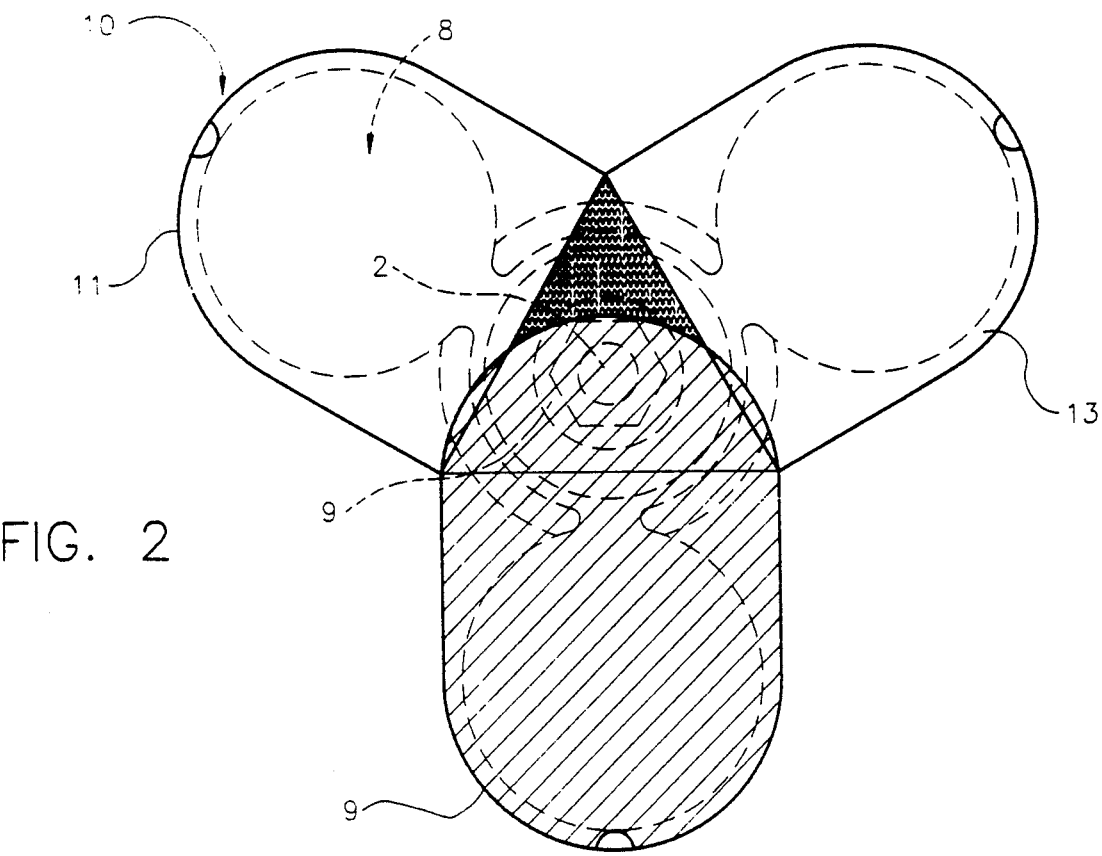
FIG. 2 shows a rear end view of the propeller with the inventive cover thereon.
Figure 4:
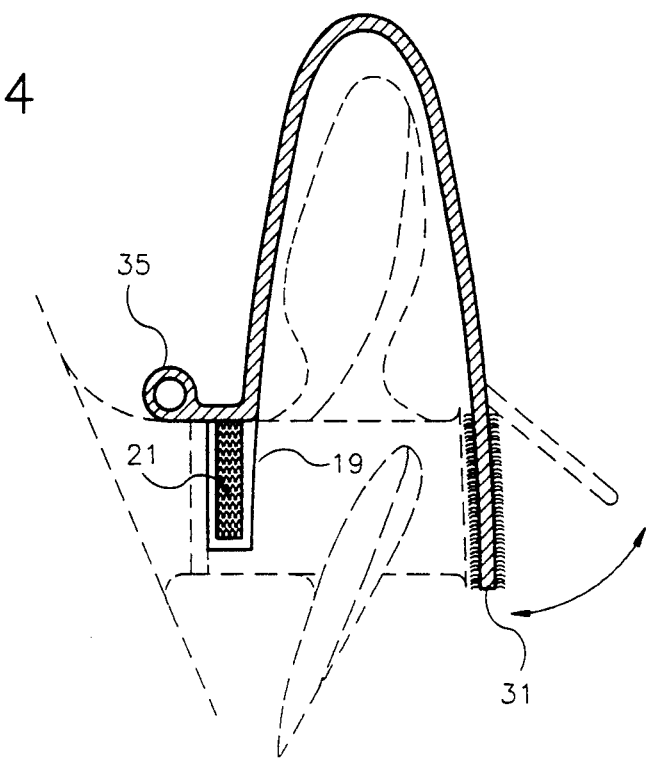
FIG. 4 shows a side view of the cover illustrated in FIG. 3.
Figure 3:
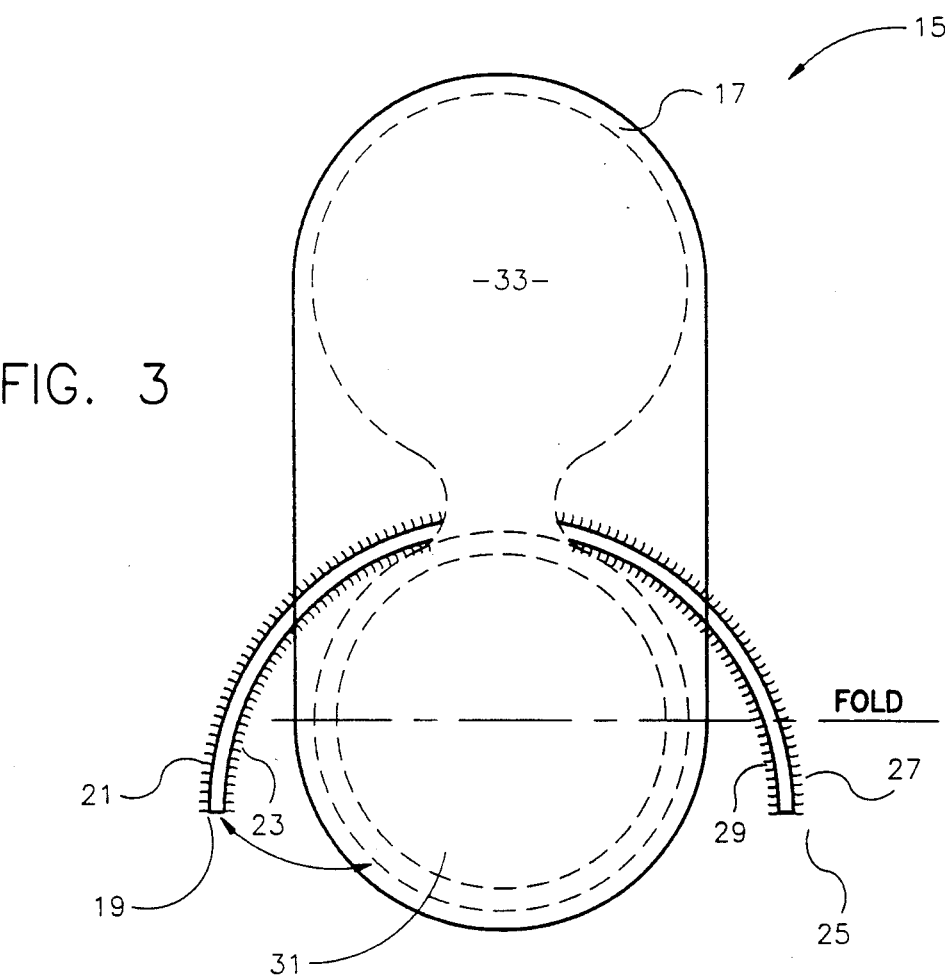
FIG. 3 shows a close-up view of one of the separate covers shown in FIG. 2.

With particular reference to FIGS. 2, 3 and 4, the inventive cover 10 is seen to be comprised of three separate covers 11, 13 and 15, one for each separate blade of the propeller 8. The propeller hub is generally designated by the reference numeral 9 in FIG. 2.

With particular reference to FIG. 3, the separate cover 15, which is representative of the covers 11, 13 and 15, is seen to include a blade covering portion 17, a hub covering portion 31, and laterally extending attachment means 19, 25 which are intended to facilitate attachment of each separate cover to adjacent covers as illustrated in FIG. 2.

Referring back to FIG. 3, the attachment means 19 is seen to include hook and pile fastening means on the upper and lower faces thereof designated by the reference numerals 21 and 23. In the preferred embodiment, one of the elements 21, 23 comprises the hook portion of a hook and pile fastening means, while the other of the elements 21, 23 comprises the pile portion of a hook and pile fastening means.

Similarly, the faces of the laterally extending attachment means 25 are covered with one-half of a hook and pile fastening means on each face thereof, generally designated by the reference numerals 27 and 29. In the case of the fastening means 25, the orientation of the hook portion and pile portion of the fastening means is reversed as compared to the orientation on the fastening means 19. This is because, with reference to FIG. 2, one of the fastening means 19, 25 is intended to be placed underneath a fastening means of an adjacent separate cover, whereas the other of the fastening means 19, 25 is intended to be placed in overlying relation to an adjacent fastening means of an adjacent separate cover. Thus, such reversal of orientation is helpful in allowing interchangeability of the separate covers.

With reference to FIGS. 2 and 3, it is seen that each separate cover includes a hub covering flap 31 which, when combined with the hub covering flaps of the other separate covers, cover the hub 9 of the propeller 8.

As shown, in particular, in FIG. 3, the material of the separate covers 11, 13 and 15 is covered with reflective patches 33 which form a striped configuration. Alternatively, the material of the separate covers may be made entirely of a reflective material or may be made of a material such as burlap, which is entirely or partially covered with a reflective material. It is important to note that the main purpose of the present invention is to provide a reflector incorporated in a cover for a propeller which is mounted on a boat carried by a trailer which is towed by a vehicle so as to reflect the light of following vehicles to provide an added safety factor when one is towing a boat on a trailer using a tow vehicle.

Figure 5:
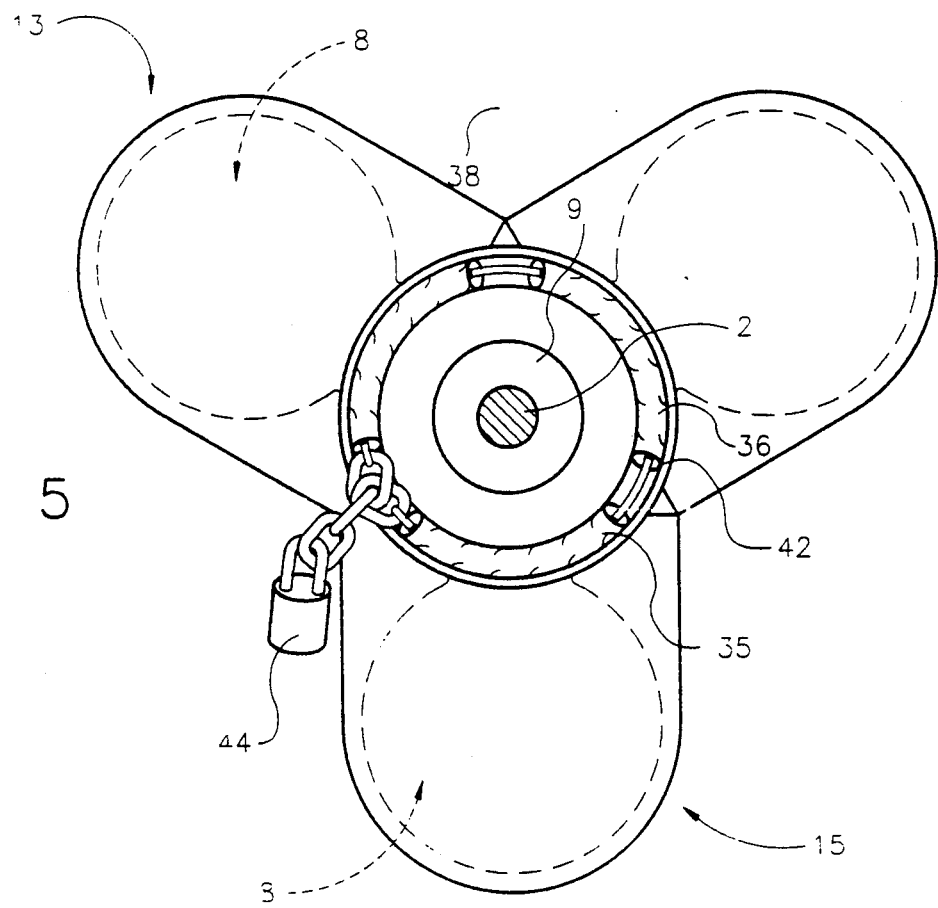
FIG. 5 shows a front view of the propeller with the inventive cover thereon.

FIG. 4, in particular, shows the relationship between the hub covering flap 31 of the separate cover 15, the fastening means 19, and the fasteners 21, 23 thereon. FIGS. 4 and 5 show the additional feature of a safety sleeve 35 which is designed to be used in a manner which should be understood by those skilled in the art to attach a chain 42 or other fastening means on the cover 10 so as to prevent unauthorized removal of the reflective propeller cover 10. With particular reference to FIG. 5, the sleeve 35 of the separate cover 15 combines with sleeves 36 and 38 respectively formed in the separate covers 11 and 13 to form a continuous passageway through which may be inserted the chain 42. A lock 44 is used to lock the ends of the chain 42 together to prevent unauthorized removal of the chain 42 and disassembly of the cover 10.

Of course, if desired, some other fastening means other than the hook and pile fasteners illustrated in FIGS. 2-4 may be employed. Thus, the separate covers may be interconnected using zippers, snaps, laces, or any other fastening means. Hook and pile fastening means has been illustrated in the drawings as the preferred fastening means, since it is the easiest means for interconnecting the separate covers together. In a further aspect, the length of overlap between the hook and pile fastening means of adjacent separate covers as illustrated in FIG. 2 allows the inventive reflective propeller cover 10 to be employed on propellers having similarly sized blades, but larger or smaller hubs.

As such, an invention has been disclosed in terms of preferred embodiments thereof which fulfill each and every one of the objects of the invention as set forth hereinabove and provide a new and improved reflective propeller cover of great novelty and utility. Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. A cover for a propeller having a plurality of blades connected to a hub, comprising:
   (a) a covering means for covering said blades including a separate cover for each blade, and
   (b) said covering means having a reflective surface;
   (c) said separate covers being interconnected by hook and pile fastening means.

2. The invention of claim 1, wherein said covering means at least partially covers said hub.

3. In a boat carried by a trailer, said boat having drive means including a propeller having a plurality of blades connected to a hub, the improvement comprising a cover for said propeller comprising:
   (a) covering means for covering said blades including a separate cover for each blade, and
   (b) said covering means having a reflective surface;
   (c) said separate covers being interconnected by hook and pile fastening means.

4. The invention of claim 3, wherein said covering means at least partially covers said hub.

5. The invention of claim 3, further including locking means for preventing unauthorized removal of said covering means from said propeller.

* * * * *